UNITED STATES PATENT OFFICE 2,532,279

HYDROGENATED FURFURALACETOFURAN

Kliem Alexander, Peoria, Ill., assignor to the United States of America as represented by the Secretary of Agriculture No Drawing. Application February 15, 1949, Serial No. 76,637

8 Claims. (Cl. 260—345)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to hydrogenation of furfuralacetofuran, and has among its objects the production of hydrogenation derivatives of the furfuralacetofuran which are economical and valuable, and such other objects as will be apparent from the following specification.

Furfuralacetofuran, a known compound, has the following structural formula:

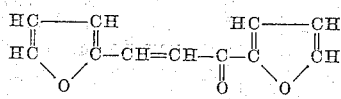

It may be prepared in approximately 90 percent yields by condensing 2-acetylfuran with furfural, and can be derived almost entirely from furfural in an overall yield of approximately 75 percent. Thus, it may be produced economically from readily available raw materials, such as oat hulls, corncobs, flax shives, and the like.

According to the invention, furfuralacetofuran is hydrogenated to produce derivatives varying in degree of hydrogenation from the simple saturation of the double bond in the aliphatic chain to the completely hydrogenated compound 1,3-ditetrahydrofurylpropanol-1. This is accomplished by hydrogenating the furfuralacetofuran under varying conditions of temperature, ranging from 35° to 160° C., in the presence of a hydrogenation catalyst, the higher temperatures and more active catalysts producing the higher degree of hydrogenation.

These derivatives have valuable solvent properties and are valuable as intermediates for a plurality of different chemical syntheses. By rupture of the heterocyclic rings, the preparation of numerous open chain di- and polyfunctional derivatives is made possible. They may be used in the production of various high-boiling esters, nitriles, halogen derivatives, amines, carboxylic acids, substituted lactones, ethers, dehydration products, and so forth.

The first stage in hydrogenation results in saturation of the aliphatic double bond, producing furyl-beta-furylethyl ketone,

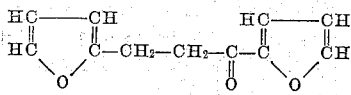

This is accomplished under mild conditions of hydrogenation employing a nickel-on-Celite as the hydrogenation catalyst, or other catalyst of similar activity, at temperatures from 35° to 60° C.

The next stage is accomplished by hydrogenating under slightly more intense conditions and results in transformation of the carbonyl to a carbinol group, producing 1,3-difurylpropanol-1,

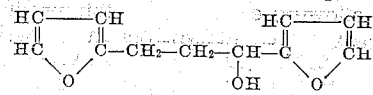

As starting material for the second stage, either furfuralacetofuran or furyl-beta-furylethyl ketone may be employed. The hydrogenation is carried out at temperatures from 80° to 120° C. employing a copper chromite type of hydrogenation catalyst, or other similar activity type.

The final stage is accomplished by hydrogenating under still more intensive conditions and results in complete hydrogenation, producing 1,3-ditetrahydrofurylpropanol-1,

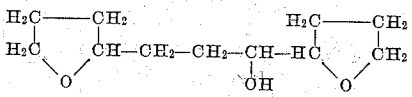

As starting materials, any of furfuralacetofuran, furyl-beta-furylethyl ketone, or 1,3-difurylpropanol-1 may be used. The hydrogenation is carried out at temperatures from 120° to 160° C. employing Raney nickel as the hydrogenation catalyst or other catalyst of similar activity.

The three derivatives above described are represented by the formula

in which R is selected from the monovalent radicals,

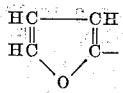

and

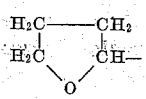

and R' is selected from the divalent radicals,

and

R' of the selection

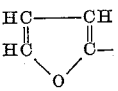

can appear only in case R is

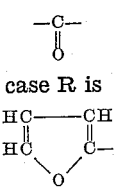

since in the process the

radical is converted to

under less drastic conditions than required for converting the

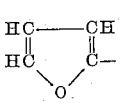

radical to

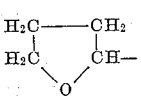

The following examples exhibit production of the hydrogenated derivatives in greater detail. Parts are by weight unless otherwise specified. In each of these examples the hydrogenation was effected by employing a rocker-type hydrogenation bomb assembly. About 2 to 10 percent of the designated catalyst, based on the weight of the material to be hydrogenated, was suspended in the solution, hydrogen was introduced from pressure cylinders in accordance with the designated pressures, the supply cut off, and the reaction carried out by heat and agitation of the bombs. As the reaction proceeds, the pressure in the reactors drops accordingly.

EXAMPLE I

*Production of furyl-beta-furylethyl ketone from furfuralacetofuran*

Furfuralacetofuran (0.5 mol) was dissolved in absolute ethanol, and the solution was hydrogenated at a temperature of 40° to 50° C. and an initial pressure of about 2000 lbs. per square inch absolute, employing nickel-on-Celite as the catalyst. The rate of reaction decreased fairly sharply after absorption of 1 mol of hydrogen.

The reaction mixture was distilled to give furyl-beta-furylethyl ketone in approximately 85 percent yield. It is a yellow liquid, boiling at 104°–110° C. (0.5 mm.); $d_4^{27}$, 1.1642, $n_D^{27}$, 1.5400.

The oxime of the above ketone was prepared. Crystallization from a methanol-water mixture gave colorless needles, M. P. 83°–84° C. *Anal.*— Cal'd. for $C_{11}H_{11}O_3N$: N, 6.83. Found: N, 6.82, 6.88.

EXAMPLE II

*Production of 1,3-difurylpropanol-1 from furfuralacetofuran*

One-half mol (94 g.) of furfuralacetofuran was dissolved in 370 cc. of absolute ethanol. Copper-chromium oxide was added as the catalyst, and the reaction mixture was hydrogenated. Absorption of hydrogen occurred rapidly in the temperature range of 90° to 115° C. at a pressure of 300–1000 pounds per square inch. The reaction stopped abruptly when 2 mols of hydrogen per mol of furfuralacetofuran had been absorbed.

The reaction mixture was filtered from the catalyst, the solvent was evaporated, and the residue distilled at reduced pressure. 87 g. of 1,3-difurylpropanol-1 was obtained as a colorless liquid, B. P. 99–100° C. (0.25 mm.); $d_4^{25}$, 1.1388, $n_D^{25}$, 1.5133. The product reacts with 3,5-dinitrobenzoyl chloride in the presence of pyridine to give a good yield of the 3,5-dinitrobenzoate ester. This ester crystallized from ethanol as nearly colorless fine needles, M. P. 93.5°–94.5° C. *Anal.*— Cal'd. for $C_{18}H_{14}O_8N_2$: C, 55.95; H, 3.65; N, 7.26. Found: C, 55.92; H, 3.56; N, 7.33.

EXAMPLE III

*Production of 1,3-ditetrahydrofurylpropanol-1 from furfuralacetofuran*

Furfuralacetofuran (0.33 mol) was dissolved in absolute ethanol and hydrogenated at a temperature of 130° to 150° C. and an initial pressure of about 2000 pounds per square inch, employing Raney nickel as the catalyst. A 95 percent yield of 1,3-ditetrahydrofurylpropanol-1 was obtained. The compound is a colorless, somewhat viscous liquid, miscible with water in all proportions. It boils at 110° C. (0.5 mm.); $d_4^{25}$, 1.0617; $n_D^{25}$, 1.4782. $M_D$ cal'd., 53.41. $M_D$ found, 53.42. *Anal.*—Cal'd for $C_{11}H_{20}O_3$: C, 65.95; H, 10.05. Found: C, 65.8; H, 10.03.

This compound is also miscible in all proportions in ether, benzene, alcohol, nitrobenzene, carbon tetrachloride, chloroform and ligroin.

Although the hydrogenation catalysts before mentioned are preferred for reasons of convenience, others having similar activities, as known to the art generally, may be substituted. Also, it is preferable, but not essential, to use superatmospheric pressures ranging from 150 to 1500 pounds per square inch.

The stages between the three described derivatives are fairly well defined. Any of the mentioned derivatives may be obtained by observing the hydrogenation conditions specified. Also, a simple observation of the rate of hydrogen absorption (when no more hydrogen is absorbed) indicates completion of a stage.

The foregoing examples are directed to obtaining the three mentioned derivatives in a highly purified form. Other derivatives may be obtained which are presumably mixtures of those mentioned by using conditions varying between those specified. This is more fully exhibited in the following example:

EXAMPLE IV

Furfuralacetofuran (0.4 mol) was dissolved in absolute ethanol and hydrogenated over a nickel-on-Celite catalyst at 100° C. and 2000 pounds initial pressure. The reaction was stopped when 2 mols of hydrogen had been absorbed. The product is colorless after distillation (B. P. 102°–105° C. at 0.3 to 0.4 mm.), becoming yellow on standing for 24 hours. *Anal.*—C, 68.0, 68.3; H, 66.29, 6.38; $d_4^{27}$, 1.1409; $n_D^{27}$, 1.5196.

The above product can be hydrogenated completely as illustrated by the following:

Sixty-four grams of the product (0.333 mol) was hydrogenated in absolute ethanol over 3 grams of Raney nickel catalyst at a temperature of 100°–135° C. and 2000 pounds initial pressure. Absorption of approximately the calculated amount of hydrogen occurred within one hour. The reaction mixture was filtered and the product distilled to give 43 grams of 1,3-ditetrahydrofurylpropanol-1. It boils at 105° C. (0.5 mm.); $d_4^{25}$, 1.0631; $n_D^{25}$, 1.4779.

The solubility characteristics of the last-mentioned product were the same as those for the product of Example III.

The following table indicates solubility characteristics of the three mentioned derivatives in various solvents:

TABLE
Solubilities

| Solvent | Furyl-beta-furyl-ethyl ketone | 1,3-Difuryl-propanol-1 | 1,3-Ditetra-hydrofuryl-propanol-1 |
|---|---|---|---|
| Ethanol | Miscible | Miscible | Miscible. |
| Benzene | do | do | Do. |
| Chloroform | do | do | Do. |
| Ethyl ether | do | do | Do. |
| Petroleum ether | Sl. soluble | Sl. soluble | Do. |
| Water | Insoluble | Insoluble | Do. |
| Nitrobenzene | | | Do. |
| Carbon tetrachloride | | Miscible | Do. |
| Pyridine | | | Do. |
| Furan | | | Do. |
| Ethylene glycol | | Miscible | |
| Cyclohexane | | do | |

Having thus described the invention, what is claimed is:

1. A compound of the formula $$R\text{---}CH_2\text{---}CH_2\text{---}R'\text{---}R$$

where R is selected from the monovalent radicals consisting of

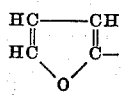

and

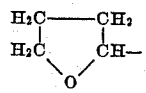

and R' is selected from the divalent radicals consisting of

and

R' of the selection

appearing only when R is the selection

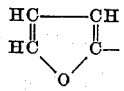

2. Furyl-beta-furylethyl ketone.
3. 1,3-difurylpropanol-1.
4. 1,3-ditetrahydrofurylpropanol-1.
5. A process of hydrogenating furfuralacetofuran, characterized in that the hydrogenation is conducted at a temperature from 35° to 160° C. in the presence of a hydrogenation catalyst, to produce hydrogenation derivatives ranging from furyl-beta-furylethyl ketone to 1,3-ditetrahydrofurylpropanol-1, the derivatives having the higher degree of hydrogenation requiring the higher temperatures and more active catalysts.
6. The process according to claim 5, wherein the temperature ranges from 35° to 60° C. and the derivative produced is furyl-beta-furylethyl ketone.
7. The process according to claim 5, wherein the temperature ranges from 80° to 120° C., the catalyst is a copper-chromium oxide catalyst, and the derivative produced is 1,3-difurylpropanol-1.
8. The process according to claim 5, wherein the temperature ranges from 120° C. to 160° C., the catalyst is Raney nickel, and the derivative produced is 1,3-ditetrahydrofurylpropanol-1.

KLIEM ALEXANDER.

REFERENCES CITED

The following references are of record in the file of this patent:

Burdick et al.: J. A. C. S., vol. 56, pp. 438–442, Feb. 1934.

C. A. Weygand et al.: vol. 29, p. 7974 (1935).

Owen: Ann. Repts. Progress of Chem., vol. 42 (1945), pp. 166–168.

Certificate of Correction

Patent No. 2,532,279            December 5, 1950

KLIEM ALEXANDER

It is hereby certified that error appears in the printed specification of the above numbered patent requiring correction as follows:

Column 4, line 62, for "66.29" read *6.29*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*